June 21, 1938. W. M. SELIG 2,120,993
CABLE CONNECTER FITTING
Filed July 16, 1936

INVENTOR.
William M. Selig
BY Albert V. Jacobs
his ATTORNEYS.

Patented June 21, 1938

2,120,993

UNITED STATES PATENT OFFICE 2,120,993

CABLE CONNECTER FITTING

William M. Selig, Brighton, Mass., assignor to Charles D. White Company, Boston, Mass., a corporation of Massachusetts Application July 16, 1936, Serial No. 90,838

1 Claim. (Cl. 247—43)

My present invention relates to cable connecters and more especially to connecter fittings provided with inspection apertures such that an insulating bushing provided within the fittings may be readily inspected after installation of the fittings.

Prior fittings have unsatisfactorily solved the problem of the inspection of the required insulating bushing in connecter fittings mainly because of the fact that the problem was attacked by modifying the body portion thereof whereas the connecters do not make it possible completely to solve the problem in this manner. Mere provision of windows or openings in the body of the connecters has in fact proved to be inadequate because the armored cable used therewith terminates within the fittings short of the outlet boxes with which they are assembled and, as a result, these windows or openings do not enable inspection of the bushing to be made after installation with any great degree of effectiveness or ease. These facts will be more clearly understood from an inspection of Fullman Patent #1,769,947 which is typical of prior fittings and over which the present invention is intended as an improvement and over which the present invention has important distinctions and advantages.

Among the objects and advantages of my present invention are simplicity of construction, ease of manufacture and assembly, low cost both of manufacture, repair and replacement, effectiveness of inspection both before and after assembly with an outlet box and the provision of inspection apertures in a threaded extension of the fitting body so that they lie within the outlet box on the room side thereof instead of behind the outlet box wall as in known fittings, and thus permitting re-checking after installation is completed.

Other and further objects and advantages will be understood by those skilled in this art or will be apparent or pointed out hereinafter.

Figure 1:
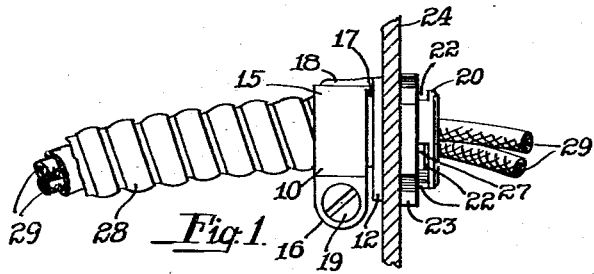
Figure 1 is a side elevational view of the invention with a cable in place and showing fragmentarily the position of the outlet box wall with relation to the invention.
Figure 3:
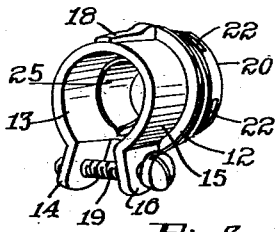
Figure 3 is a perspective view of the fitting by itself.
Figure 2:
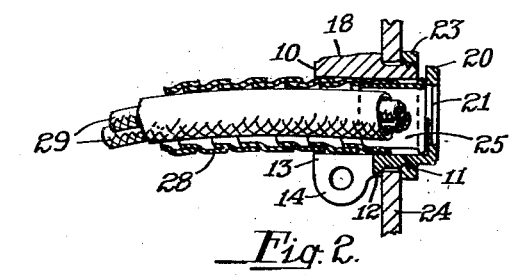
Figure 2 is a vertical sectional view through Figure 1.
Figure 4:
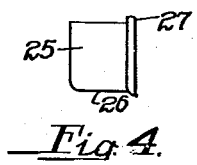
Figure 4 is a side elevational view of the insulating bushing.

In Figures 1–3, inclusive, the numeral 10 indicates the body portion of the fitting which is exteriorly threaded as at 11 and which has a central annular raised bead or ridge 12 extending around its periphery. Rearwardly of the annular bead 12 is a clamp portion consisting of a semi-circular piece 13 terminating in an apertured ear 14, and a second semi-circular piece similarly terminating in an apertured ear, these being respectively designated by the numerals 15 and 16. Piece 13 is unitary with the body portion 10 whereas piece 15 is slightly spaced therefrom (the space being indicated by the numeral 17) but otherwise is a continuation of piece 13. Strengthening portion 18 of triangular nature lies at the transition point, that is, between pieces 13 and 15. A suitable screw 19 passes through apertured ears 14 and 16 and is used to draw the ears together, such movement being permitted due to the construction just described and thereby forming a clamp or clamping arrangement. This is known in the trade as a "squeeze" type fitting since it contracts upon the armored cable therewithin.

Disposed forwardly of the threaded body portion 10 is the extension or flange 20. Portion 20 may be either integral or unitary with the body portion 10 as may be desired or preferred and it has an end opening 21 and side inspection apertures 22. It is clear that portion 20 acts as a stop or abutment for the insulating bushing.

Numeral 23 indicates a clamping nut which is interiorly threaded for engagement with the threads 11 of body portion 10. After the otherwise assembled fitting is installed in proper relationship to an outlet box, the rear wall of which is fragmentarily shown at 24, the nut 23 is threaded on threads 11 and tightened against wall 24 thus completing the installation.

Numeral 25 designates an insulating bushing usually made of fibrous material and colored red. This bushing is positioned within the fitting abutting extension or flange 20 as will be particularly clear from Figure 2. This bushing is cylindrical, is split along one side as shown at 26 and has a flanged forward end 27 against which the forward edge of armored cable 28 abuts. The forward cable edge is sharp and frequently ragged but is thus permitted to save from being damaged the insulated electrical current carrying wires 29 which pass through the armored cable and project forwardly through extension 20 of the fitting and thence into the outlet box for connection purposes.

From Figures 1 and 2 it will be clear that the inspection apertures 22 lie forwardly of outlet box wall 24, that is to say, the inspection apertures are on the room side of wall 24 where they are accessible for re-checking or re-inspection purposes. Thus the presence and proper positioning of insulating bushing 25 can not only be inspected prior to the installation of the outlet box but afterwards as well. This is both highly desirable and important because the acts of installing and connecting the outlet box, the manipulation of the fitting therethrough and tightening of clamping nut 23 may cause maladjustment of the bushing 25 with consequent partial or total loss of the necessary functioning thereof thus giving rise to the possibility of subsequent damage and short circuiting with the attendant dangers of such.

Figure 5:
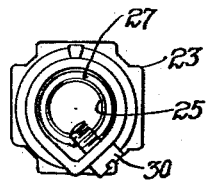
Figure 5 is a rear view of a modified fitting.
Figure 6:
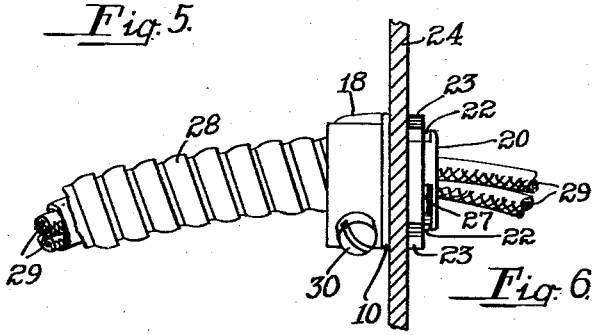
Figure 6 is a view similar to Figure 1 of the modification of Figure 5.

In Figures 5 and 6 I have illustrated a modification of my invention. These figures show a set screw type fitting which is fundamentally the same as the fitting already described. The modified fitting, however, has no annular bead 12 although it may be provided with such if desired or preferred. The main difference between the fitting of Figures 1-3 and that of Figures 5-6 lies in the manner of securing the fitting to the armored cable 28. The rear end of the latter fitting is pinched on one side to a V-shape. A set screw 30 passes through an aperture in one of the sides of the V substantially normal thereto and impinges against cable 28 to complete this much of the assembly. Otherwise, the modified fitting is the same as the preferred form as is indicated by the use of similar numerals thereon. No space or split 17 is necessary in the fitting of Figures 5-6 as will be understood.

It is to be understood that the foregoing is intended as illustrative rather than limitative and that suitable variations may be made to suit requirements or conditions. While ordinarily the fittings will be made in sizes having openings of $\frac{3}{8}''$, $\frac{3}{8}A''$, $\frac{1}{2}''$, $1''$, $1\frac{1}{4}''$, $1\frac{1}{2}''$ and $2''$, I may make them of any size, of any approved material and in any relative proportions. The threaded fitting portion as well as the extension may be straight or tapered and either round or square on the forward corners. Where the body and extension are integral rather than unitary they may be united by welding, brazing, soldering or any other satisfactory manner. Rather the invention is to be defined by the subjoined claim.

I claim:

A connecter fitting for joining a conductor to an outlet box, said fitting comprising a body into which the conductor and an insulating bushing are to extend and having at its inner end a protecting flange, and means to secure said body to the outlet box, the fitting having a plurality of apertures behind said flange to facilitate inspection to determine the presence of said bushing.

WILLIAM M. SELIG.